United States Patent
Piock et al.

[11] Patent Number: 5,979,399
[45] Date of Patent: Nov. 9, 1999

[54] INTERNAL COMBUSTION ENGINE WITH SPARK IGNITION

[75] Inventors: Walter Piock; Martin Wirth, both of Hitzendorf, Austria

[73] Assignee: AVL List GmbH, Graz, Austria

[21] Appl. No.: 09/141,315

[22] Filed: Aug. 27, 1998

[30] Foreign Application Priority Data

Aug. 28, 1997 [AT] Austria ................................ 532/97 U

[51] Int. Cl.$^6$ .................................................. F02B 31/00
[52] U.S. Cl. ........................... 123/301; 123/302; 123/305
[58] Field of Search .................................. 123/301, 302, 123/276, 279, 295, 305

[56] References Cited

U.S. PATENT DOCUMENTS

| | | | |
|---|---|---|---|
| 3,504,681 | 4/1970 | Winkler | 123/279 |
| 4,446,830 | 5/1984 | Simko et al. | 123/262 |
| 4,516,549 | 5/1985 | Brear | 123/262 |
| 4,719,884 | 1/1988 | Shinno | 123/262 |
| 5,775,288 | 7/1998 | Suzuki et al. | 123/302 |
| 5,819,700 | 10/1998 | Ueda et al. | 123/279 |

FOREIGN PATENT DOCUMENTS

| | | |
|---|---|---|
| 001392 | 4/1997 | Austria . |
| 2421276 | 10/1979 | France . |
| 649738 | 8/1937 | Germany . |
| 7102976 | 4/1995 | Japan . |

OTHER PUBLICATIONS

A.J. Scussel et al., "The Ford PROCO Engine Update" in SAE 780699, Aug. 7–10, 1978.

L.W. Evers, "Characterization of the Transient Spray from a High Pressure Swirl Injector" in SAE 940188.

*Primary Examiner*—John Kwon
*Attorney, Agent, or Firm*—Watson Cole Grindle Watson, PLLC

[57] ABSTRACT

In an internal combustion engine with spark ignition and one or more reciprocating pistons, with an ignition device and at least one fuel delivery device for each cylinder, and with a combustion chamber bounded by a roof-shaped top face, the surface of the piston top is provided with an unsymmetrical, arched flow guiding rib assisting the swirl movement of the cylinder charge. The flow guiding rib is configured as an integral part of the piston top surface, which largely conforms to the roof-shaped top of the combustion chamber, and includes an essentially centrically positioned combustion chamber recess with an entrance area in close proximity of the fuel delivery device.

13 Claims, 4 Drawing Sheets

INTERNAL COMBUSTION ENGINE WITH SPARK IGNITION

BACKGROUND OF THE INVENTION

This invention relates to an internal combustion engine with spark ignition and at least one reciprocating piston, with an ignition device and at least one fuel delivery device per cylinder for direct fuel delivery essentially in the direction of the ignition device, and with at least one intake port generating a swirl movement in the combustion chamber bounded by a roof-shaped top face, the top surface of the piston being provided with an unsymmetrical, arched flow guiding rib assisting the swirl movement of the cylinder charge.

DESCRIPTION OF THE PRIOR ART

Ever stricter demands on fuel consumption and exhaust emissions, in particular the reduction of hydrocarbon emission, necessitate the use of new technologies for internal combustion engines. With modern systems of external mixture formation employed in engines of the spark-ignition type, such as injection by means of a suction pipe or the use of a carburetor, part of the mixture admitted into the combustion chamber and cylinder flows into the exhaust passage of the engine during the phase of valve overlap, i.e., when intake and exhaust valve are open simultaneously. Besides, a considerable percentage of the unburnt hydrocarbons found in the exhaust passage originates from parts of the mixture coming from annular gaps or wall areas where no combustion occurs. An additional point is the need for rendering the cylinder charge homogeneous, at an approximately stoichiometric fuel-air ratio, to ensure reliable combustion without misfiring. For this purpose the engine load must be controlled with the use of a throttling device checking the total volume of the admitted mixture (quantity control).

Such throttling of the intake flow leads to a thermodynamic loss, which will increase the fuel consumption of the engine. If this kind of throttling is avoided, the potential fuel savings amount to an estimated 20 percent.

To overcome or reduce the above problems numerous attempts have been made at an unthrottled operation of spark-ignition engines, where the fuel is introduced into the combustion chamber and cylinder or a mixing space directly adjacent thereto only after the air has been admitted, similar to a compression-ignition engine.

Basically, there are three systems of mixture formation:
high-pressure injection of liquid fuel
air-supported fuel injection
introduction of a fuel-air mixture.

In SAE 780699 a method is described in which the fuel is directly injected into the engine combustion chamber by means of a high-pressure injection nozzle. The time required for preparation of the mixture puts a restriction on the minimum time interval between the moment of injection and the moment of ignition. The injection process demands a high level of pressure to obtain short injection times as well as satisfactory fuel atomization with a suitably small droplet spectrum. Fuel preparation and metering take place simultaneously. In order to concentrate the combustible fuel-air mixture within a locally confined region, however, it is essential that the fuel be introduced at a very late point in time of the engine cycle (if necessary, as late as during the compression phase immediately prior to ignition), to limit the time for propagation and dilution of the mixture in the air of the combustion chamber. The demands for an early injection ensuring complete evaporation of the fuel and a late injection in order to maintain mixture stratification thus are opposed to each other. For this reason further development efforts must be aimed at reducing the characteristic time required for mixture preparation whilst increasing the characteristic time during which the desired mixture stratification is maintained.

In SAE 940188 the principle of an injection valve is presented, which produces a cone-shaped injection jet with excellent fuel atomization. By changing the fuel pressure and the counterpressure in the combustion chamber the angle of the injected spraycone may be influenced. A typical property of such injection nozzles is the improvement of atomization quality with rising injection pressure. This desired dependency will lead to increasing velocities of the injection jet of up to 100 m/s, however, accompanied by a high momentum of the fuel spray entering the combustion chamber. By contrast, the air flow in the combustion chamber, even in the presence of strong intake-generated swirl or tumble movements, exhibits a far smaller momentum (not more than 25–30 m/s), such that the injection jet in a first phase of entering the combustion chamber is only slightly influenced by the flow movements prevailing therein.

In view of the above considerations the main task to be accomplished is to transform the injection jet into a locally concentrated fuel-air spraycloud, which must be advanced from the nozzle of the injection valve to the spark plug, and to further mix the mixture inside this cloud with the air in the combustion chamber. In this context the following points should be observed:

The fuel-air spray should maintain its compact shape, especially at low engine loads, and should be kept in the centre of the combustion chamber as far as possible, for thermodynamical reasons and in order to reduce the emissions of unburned hydrocarbons.

Dilution of the injected fuel-air mixture to a preferably stoichiometric air ratio must be effected in the comparatively short time interval between injection moment and ignition moment.

At the spark plug a low mean flow velocity should prevail, together with a high level of turbulence, to promote ignition of the fuel-air cloud by the spark.

In developing a suitable combustion process for a spark-ignition engine with direct fuel injection, the particular dimensions of the combustion chamber must be taken into account as well as the characteristics of injection jet propagation. In an automobile engine of the spark-ignition type typical volumes of the individual cylinder lead to bore diameters of 60–100 mm, the piston lift approximately being in the same order of magnitude.

If the injection valve is located in the cylinder head at a position inclined by a maximum angle of about 70° relative to the cylinder axis, the distance over which the injection jet may propagate freely in the instance of late injection just before the moment of ignition, will not be more than 50–60 mm, before the injection jet arrives at the wall of the combustion chamber (i.e., piston surface mostly) on the opposite side. In view of the above propagation velocities of the injection jet at least part of the fuel spray is expected to hit the surface of the piston. In designing the flow movements inside the combustion chamber this process of wetting the walls should thus be taken into account.

In shaping the spraycloud and preparing the fuel-air mixture the following effects may be utilized:

Deflection of the large momentum of the injection jet towards the spark plug by means of the piston surface;

High injection pressure to improve atomization, thus accelerating direct evaporation of the fuel spray before it reaches the wall;

Generation of an increased turbulence level in the area of the injection jet by means of the flow movements inside the combustion chamber;

Acceleration of wall film evaporation by generating a high flow velocity in the wetted area of the piston surface.

All measures obtainable with the flow movements inside the combustion chamber require the generating of a high level of charge movement during the intake process. These high flow velocities should be maintained as long as possible during the suction and compression phases or should even be increased during compression. This requirement is met best by an intake-generated swirl or tumble movement of the air in the combustion chamber. A swirl movement (rotation about the cylinder axis) constitutes the most stable flow structure in the cylinder, which will result in the lowest dissipation of kinetic energy during compression. By designing a piston recess whose diameter is smaller than that of the cylinder, the speed of rotation of the swirl vortex may be increased during compression due to torque conservation.

An intake-generated tumble vortex (rotation about an axis parallel to the crankshaft) exhibits accelerated rotation due to a reduction of the cross-sectional area during compression. On the other hand, the tumble flow is less stable than the swirl flow, and tends to divide into more complex secondary vortices. In the final phase of compression strong disintegration of the tumble vortex into smaller, stochastically distributed vortices is observed if the valve angle (of a typical four-valve combustion chamber) is sufficiently flat.

Publication AT 001 392 U1 describes an internal combustion engine with spark ignition and at least one reciprocating piston with a piston recess accelerating the intake-generated swirl movement as the pistons travels upwards. The piston recess is unsymmetrical in shape, comprising an inlet area of increasing depth, a centre area of maximum depth, and an outlet area of decreasing depth of the recess. Between outlet and inlet areas a wedge-shaped restriction is provided on the side of the fuel delivery device. Due to the shape of the piston recess the fuel jets are diverted in the direction of the centrically positioned spark plug, and the downward flow is diverted and accelerated during compression so as to obtain a high-velocity movement directed towards the spark plug in the area of the arriving fuel jets. The level of turbulence will not be high enough, however, to guarantee proper fuel inflammation for each engine speed.

JP 7-102976 A concerns an internal combustion engine of the type described in the opening paragraph of this paper, including a single arched flow guiding rib for directing the swirl flow towards the centrically positioned spark plug. The fuel is injected through an injection nozzle located at the periphery of the combustion chamber roof, into a recessed area of the top surface of the piston, which is bounded by the concave guide faces of the flow guiding rib. Due to the lateral injection towards the cylinder axis the fuel particles are thrown over and beyond the guiding rib and diverted towards an area bounded by a convex guide face of the rib and the piston rim. The diverted fuel particles will have to be redirected by the swirl movement towards the area of the spark plug, covering a lengthy flow path along the piston rim, over an angular range of more than 180°. As a consequence, the diverted fuel particles will arrive at the spark plug only at a comparatively late point in time when they are no longer useful in mixture inflammation. This will have adverse effects on hydrocarbon emissions and fuel consumption.

FR 2 421 276 A1 presents a piston for a spark ignition engine, including a piston recess which is designed to enhance turbulences. The unsymmetrically shaped piston recess features three entrance areas of different sizes, all of which open into a pot-shaped, unsymmetrical depression of the piston recess. The three entrance areas will generate a swirl flow in the depression.

In DE 649 738 C, finally, a compression ignition four-stroke internal combustion engine is described, with slide valve control and a combustion chamber that is restricted relative to the cylinder diameter. Towards the restriction of the combustion chamber the piston exhibits depressions, which will guide the flow helically from the inlet area towards the combustion chamber. This type of combustion chamber is not suitable for a spark ignition engine with direct fuel delivery.

SUMMARY OF THE INVENTION

It is an object of this invention to overcome the above problems and to improve atomization and inflammation of the fuel in an internal combustion engine of the aforementioned type.

According to the invention this object is achieved by configuring the flow guiding rib as an integral part of the piston top surface, which largely conforms to the roof-shaped top of the combustion chamber and exhibits an essentially centrically positioned combustion chamber recess with an entrance area in proximity of the fuel delivery device, and by providing the guiding rib with a tapered end of reduced width and height in the direction of the swirl flow. As the guiding rib on the piston top surface conforms to the roof of the combustion chamber on the side of the cylinder head, and as the position of the combustion chamber recess is almost centrical, the stray particles of fuel passing over and beyond the combustion chamber recess and the flow guiding rib are pushed back by a compression swirl forming between the piston top surface and the roof of the combustion chamber.

In an advantageous embodiment of the invention an inlet passage is provided which departs from the entrance area of the combustion chamber recess and winds around the tapered end of the guiding rib, and which is configured as a groove-type depression sunk into the top surface of the piston. This measure will further accelerate the swirl flow moving towards the entrance area of the combustion chamber recess, making use of the compression swirl on the outlet side.

A preferred variant of the invention proposes that compression faces be provided on the inlet and outlet sides of the piston top surface, and that the guiding rib have roof-shaped bounding surfaces adjacent to these compression faces, which may be connected by a plane area parallel to the piston top surface.

According to the invention it is provided that the plane centre of gravity z of the combustion chamber recess exhibit an eccentricity $E_h$ in the plane of the piston top surface relative to a reference plane $\epsilon$, which eccentricity obeys the conditions: $-0.12*D<E_h<0.12*D$, the reference plane $\epsilon$ being defined by the intersection line of the two roof-shaped top faces of the combustion chamber and the piston axis, and D being the piston diameter. The eccentricity E relative to the piston axis parallel to reference plane $\epsilon$ may be anywhere between $-0.03*D$ and $+0.12*D$, preference being given to a condition in which the combustion chamber recess is shifted upwardly, as shown in FIG. 3.

This position of the recess being defined by eccentricities E and $E_h$, promotes that an injected fuel jet will impact on the surface of the piston within the recess. The optimal values for E and $E_h$ within said ranges depend on fuel jet behaviour, like penetration of the fuel, shape of the jet, and on size of bore of the cylinder.

Generally speaking, small diameters of the recess have advantages with low speed and low load operation of the engine. Large diameters of the recess are advantegous at high speed and high load operation. Within a specific range for the diameter $D_m$ between 0.3*D and 0.6*D and the depth of the combustion chamber recess between 0.1*D and 0.23*D, D being the piston diameter, the best compromise on both can be obtained. In detail the size of the recess depends on engine-size and the favoured region in the operating range of the engine and have to be optimized in order to keep the stratified mixture within the volume of the recess. Despite certain deflections caused by swirl movement of intake air flow, fuel being injected during stratified operation must impact on piston surface within the recess. If not, fuel consumption and HC-emissions would increase. Further combustion stability problems may occur.

Generally speaking, free travel distance of the fuel jet should be as large as possibel, in order to minimize wall deposits of fuel. Such deposites of fuel would have to be evaporated again to avoid soot formation. It is one possiblility to distance the jet path and thus the point of impact as far as possible from the injecting nozzle and the surface of the piston. Based on defined boundary conditions, i.e., the main characteristics of the engine, e.g., height of the cylinder block, piston stroke and length of the connecting rod, the maximal depth below compression face is limited by the minimal thickness of the piston ground.

Manufacturing advantages are gained by providing the combustion chamber recess with a substantially circular shape.

The swirl generated during inlet stroke of the engine is to be led by the recess and thus by the guiding rib. The flowing-in process into the recess happens during compression stroke, wherein the piston approximates to the cylinder head. Thus the distance between the guiding ribs and the cylinder head becomes smaller than between remaining sections of the pistons. The flow will be led into the remaining volumina of the recess, where it supports mixture preparation and burn stabilization.

The starting point of guiding rib is positioned downstream the injecting nozzle, in order to catch and transport remaining fuel coming late from the nozzle by the air flow into the recess. Preferrably the starting point of the flow guiding rib is positioned such that $20°<\alpha<70°$, $\alpha$ being an angle between the reference plane and the starting point of the flow guiding rib, as measured in clockwise direction about the piston axis.

The end point is defined by the cross section, which is needed to lead the flow outside the guiding rib into the recess. Dependent on the combustion chamber roof shape (roof angle, squeezing surfaves, and so on) the end point must be selected in such a way, that on the one hand no accumulation of the flow may happen outside of the guiding rib. A preferred embodiment of the invention proposes that an tapered end of the flow guiding rib is positioned such that $120°<\beta<170°$, $\beta$ being the angle between the reference plane and the end point of the flow guiding rib, as measured in clockwise direction about the piston axis.

At the other hand the introduction of air flow should occure without (unacceptable high) seperation of flow. Within the range $\alpha$ and $\beta$ as defined these requirements may be accomplished.

For special benefit provisions may be made that the inner flow guiding face of the guiding rib form an angle $\delta$ of $-5°$ to $20°$ with the piston axis. The flow guiding face is thus designed to exhibit undercuts of up to 20° in order to keep the cloud of fuel-air mixture within the combustion chamber recess.

The behaviour of the fuel after impact on piston surface depends on the compactness and the penetration impulse of the fuel jet. At fuel jets having very high impulse, which is reflected strongly, it may be necessary to establish an overhanging slope of flow guiding face, as known from diesel engines, in order to keep the fuel jet within the recess. Using injectors with softer penetration behaviour, a slope of flow guiding face being slightly inclined to the outside might be enough (depends on the position of recess). This slope to the outside further is advantegous for fabrication of the piston by casting, wherein pulling angles of for example 5° may be necessary.

It has finally proved of advantage to provide that the depth $T_m$ of the combustion chamber recess exceed that of the groove-type inlet passage into this recess.

BRIEF DESCRIPTION OF THE DRAWINGS

The invention will now be further described with reference to the accompanying drawings, in which.

Parts with the same functions have the same reference numbers in all variants.

DESCRIPTION OF PREFERRED EMBODIMENTS

Figure 1:
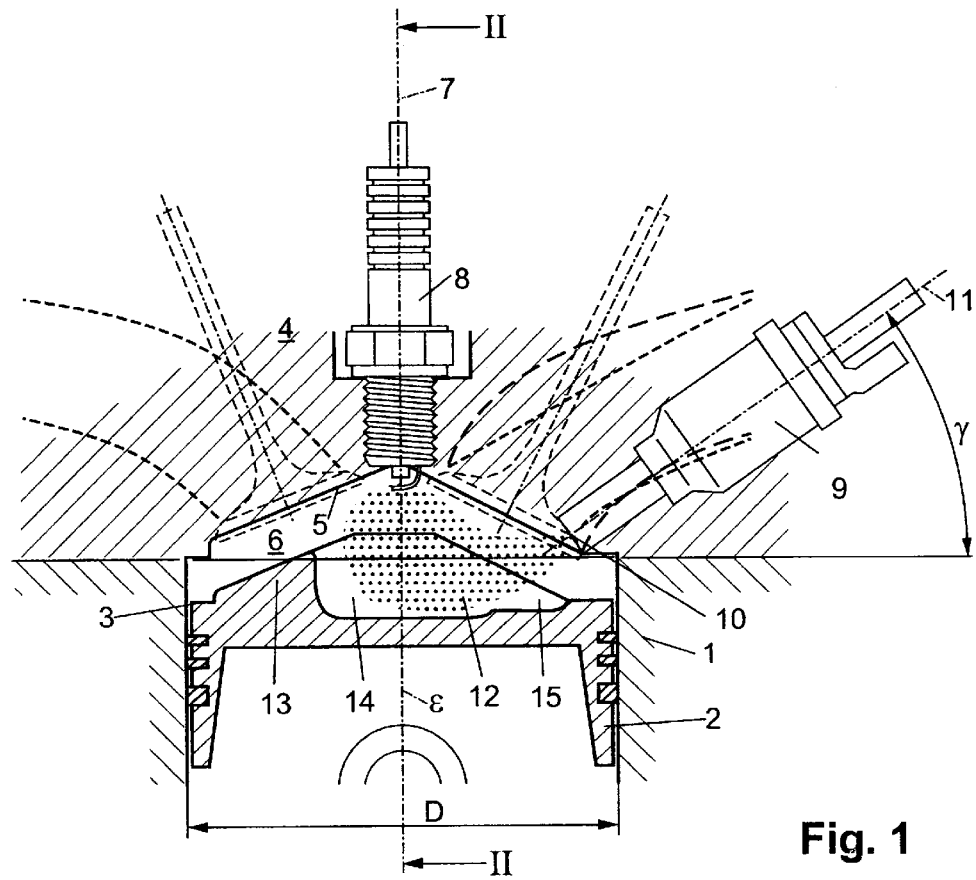
FIG. 1 shows the internal combustion engine proposed by the invention in a longitudinal section along line I—I in FIG. 2 and FIG. 3.
Figure 2:
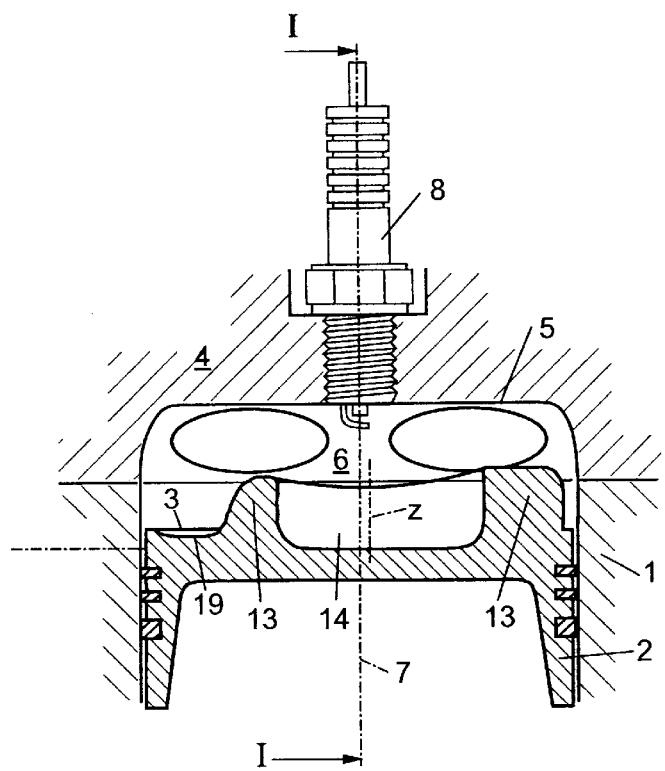
FIG. 2 is a longitudinal section along line II—II in FIG. 1 and FIG. 3.

In a cylinder 1 is positioned a reciprocating piston 2. The top surface 3 of the piston 2 and the roof-shaped top face 5 of the combustion space in the cylinder head 4 form a combustion chamber 6, into which extends an ignition device 8. The mouth 10 of a fuel delivery device 9 is situated at the periphery of the combustion chamber 6. The longitudinal axis of the fuel delivery device 9 is referred to as 11, the angle $\gamma$ between the longitudinal axis 11 and the plane of the cylinder head 4 is 25° to 60°. The fuel delivery device 9 is positioned such that an injected fuel jet 12 is directed primarily towards the ignition device 8, and that this fuel jet 12 will arrive at the piston top surface 3 in proximity of the combustion chamber recess 14 of the piston 2. For the angles and distances indicated below a reference plane ε is introduced, which is defined by the intersection line of the two roof-shaped top faces of the combustion chamber 6 and the piston axis 7 (see FIG. 1 and FIG. 3).

As is seen in FIGS. 1 to 9, the piston top surface 3 includes an integrated, unsymmetrical, arched flow guiding rib 13 assisting the swirl movement of the cylinder charge, whose upper contour largely conforms to the roof-shaped top of the combustion chamber 6, and which comprises an essentially centrically positioned combustion chamber recess 14 with an entrance area 15 located next to the fuel delivery device 9. In the direction of the swirl flow 16 (see FIG. 3, for example), the guiding rib 13 has a tapered end 17 of reduced width and height.

Departing from the entrance area 15 of the recess 14 an inlet passage 18 is provided, which winds around the tapered end 17 of the guiding rib 13, and which is sunk into the piston top surface 3 as a groove 19.

The flat parts of the piston top surface 3 widen on the inlet and outlet sides to form compression faces 20, 21, the guiding rib 13 exhibiting roof-shaped surfaces 22, 23 adjacent to these compression faces, which may be connected by a plane area 24 parallel to the piston top surface 3.

Figure 3:
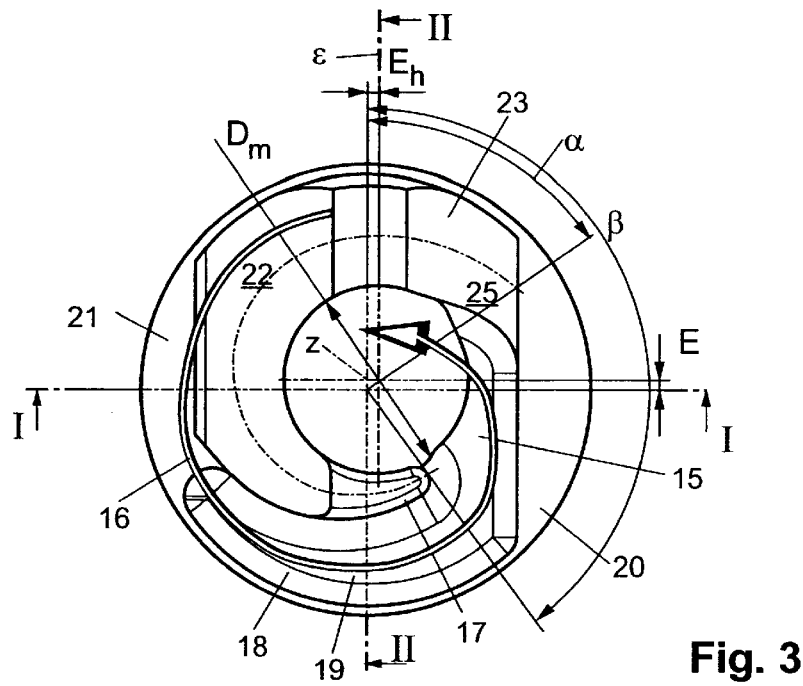
FIG. 3 is a plan view of the piston of the internal combustion engine.
Figure 4:
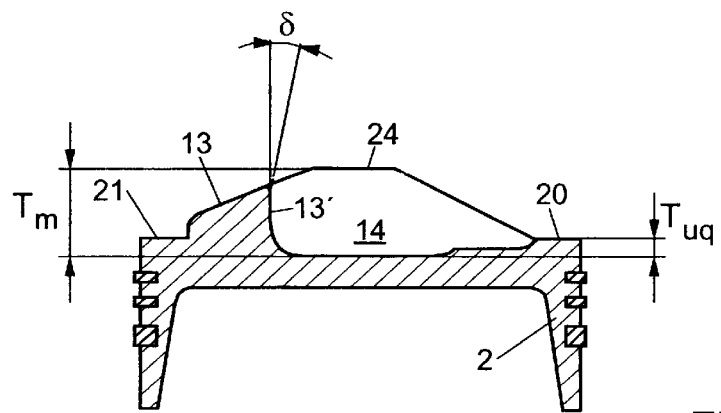
FIG. 4 is a longituinal section of the piston cut along line I—I in FIG. 2 and FIG. 3.
Figure 5:
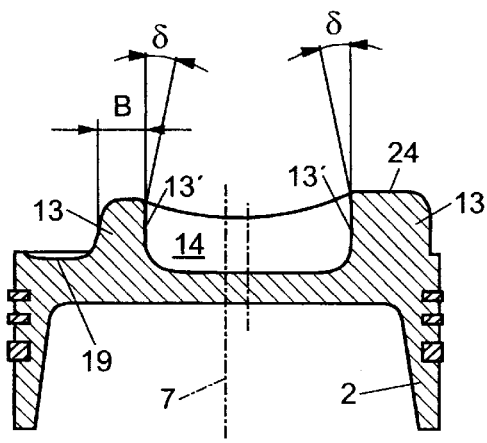
FIG. 5 is a longituinal section of the piston cut along line II—II in FIG. 1 and FIG. 3.
Figure 6:
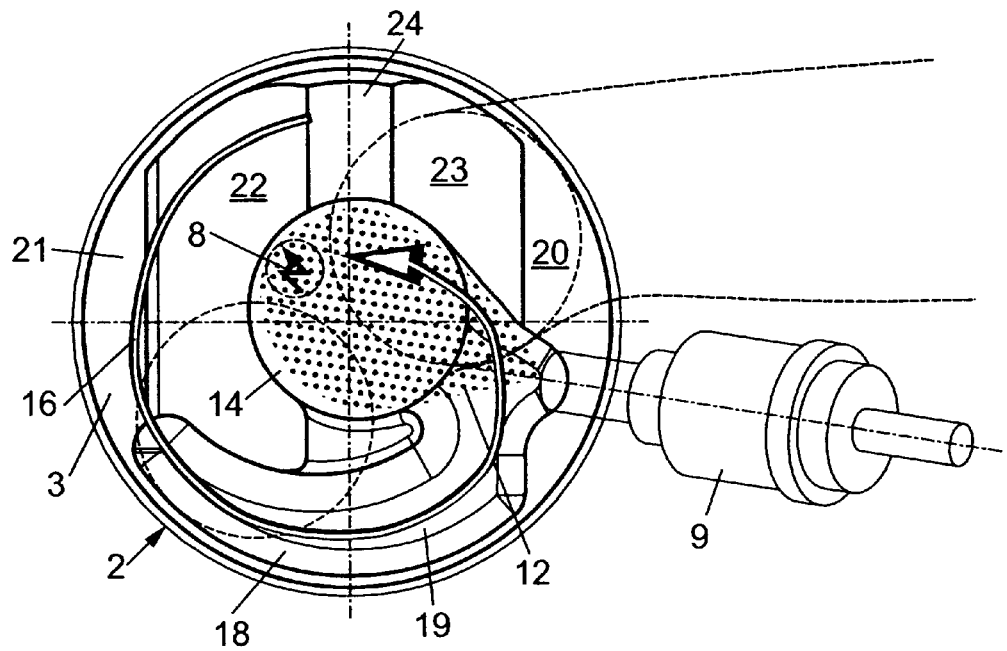
FIG. 6 shows a variant of the internal combustion engine according to the invention, with one intake valve and one exhaust valve.
Figure 7:
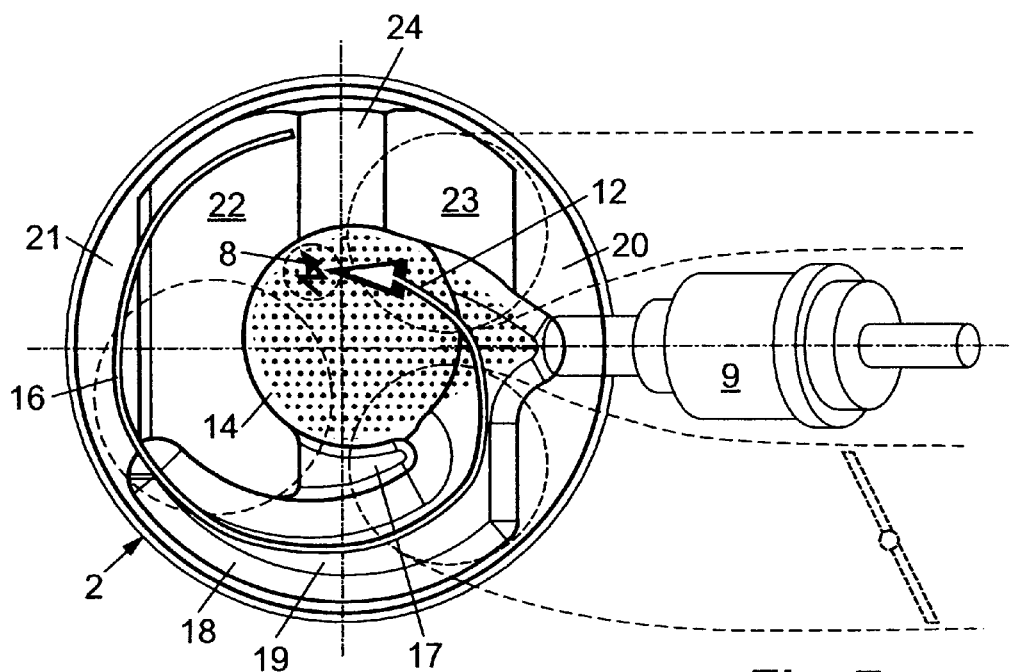
FIG. 7 shows a variant with two intake valves and one exhaust valve.
Figure 8:
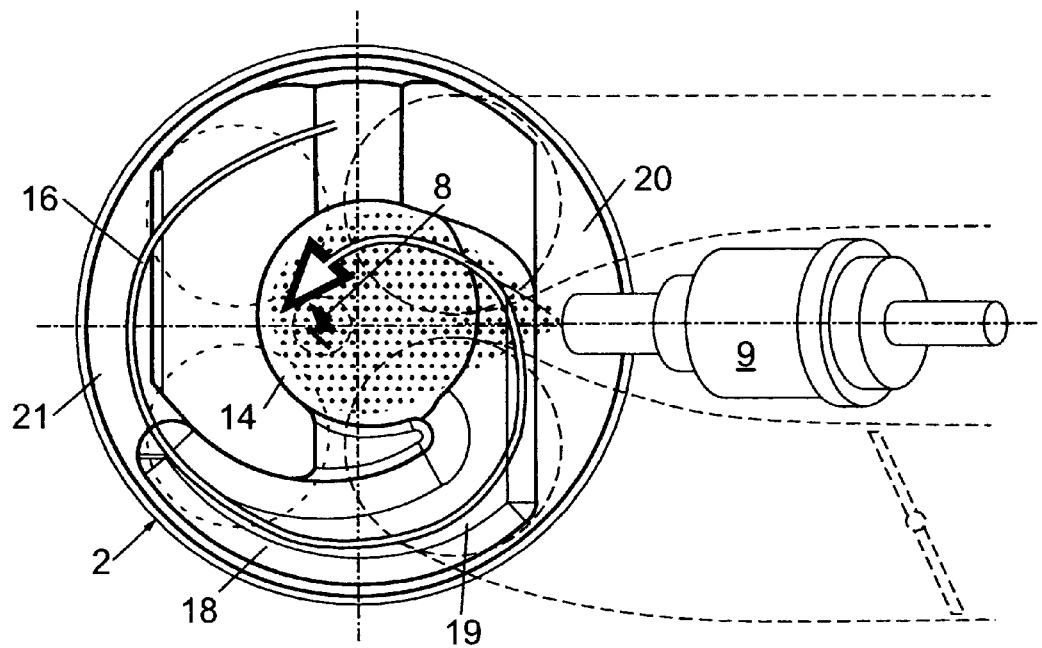
FIG. 8 shows a variant with two intake valves and two exhaust valves.
Figure 9:
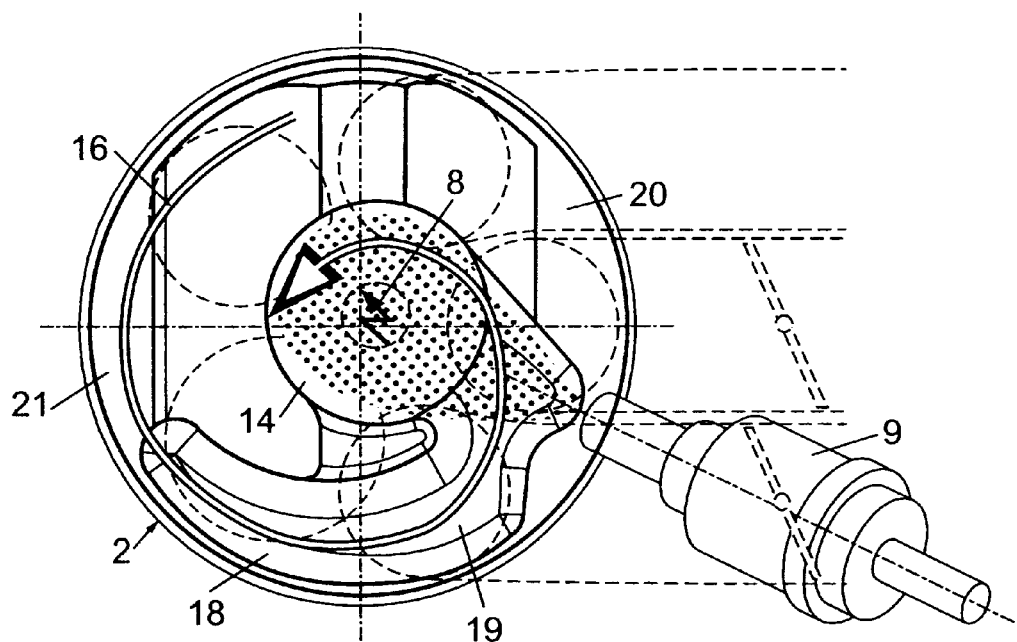
FIG. 9 shows a variant with three intake valves and two exhaust valves per cylinder of the internal combustion engine.

As is shown in FIGS. 3 to 5 especially, the invention has the following characteristics:

| | |
|---|---|
| Diameter of recess $D_m$ | $0.3*D < D_m < 0.6*D$ |
| Depth of recess $T_m$ | $0.1*D < T_m < 0.23*D$ |
| Depth below compression face $T_{ug}$ | $0.02*D \text{'} T_{ug} < 0.14*D$ |
| Width of guiding rib B | $0.06*D \text{'} B \text{'} 1 \, 0.15*D$ |
| Eccentricity E | $-0.03*D < E < +0.12*D$ |
| Eccentricity $E_h$ | $-0.12*D < E_h < 0.12*D$ |
| Guiding rib, starting point | $20° < \alpha < 70°$ |
| Guiding rib, end point | $120° < \beta < 170°$ |
| Slope of flow guiding face | $-5° < \delta < 20°$ |

The values for eccentricity refer to the plane centre of gravity z of the combustion chamber recess 14 in the plane of the piston top surface 3. The combustion chamber recess 14 could also exhibit a substantially circular shape. D refers to the piston diameter; the angles cited for the starting point 25 and the end point 17 of the guiding rib 13 are measured from the reference plane ε, in clockwise direction about the piston axis 7. The inner flow guiding face 13', which forms the wall of the combustion chamber recess, may be inclined outwardly ($\delta<5°$), or inwardly (67 <20°).

As is seen from FIGS. 6 to 9, the invention is advantageously applied to variants with two, three, four or five valves per cylinder.

We claim:

1. An internal combustion engine with spark ignition and at least one reciprocating piston, comprising:
   an ignition device; at least one fuel delivery device per cylinder for direct fuel delivery essentially in the direction of the ignition device;
   at least one intake port generating a swirl movement of a cylinder charge in a combustion chamber bounded by a roof-shaped top face;
   a top surface of the piston being provided with an unsymmetrical, arched flow guiding rib assisting the swirl movement;
   wherein the flow guiding rib is configured as an integral part of the piston top surface, which largely conforms to the roof-shaped top face of the combustion chamber and exhibits an essentially centrically positioned combustion chamber recess with an entrance area in proximity of the fuel delivery device, and wherein the flow guiding rib has a tapered end of reduced width and height in the direction of the swirl flow.

2. The internal combustion engine according to claim 1, wherein an inlet passage is provided which departs from the entrance area of the combustion chamber recess and winds around the tapered end of the flow guiding rib, and which is configured as a groove-type depression sunk into the piston top surface.

3. The internal combustion engine according to claim 1, wherein compression faces are provided on inlet and outlet sides of the piston top surface, the flow guiding rib having roof-shaped bounding surfaces adjacent to said compression faces.

4. The internal combustion engine according to claim 3, wherein the roof-shaped bounding surfaces are connected by a plane area parallel to the piston top surface.

5. An internal combustion engine according to claim 1, wherein a plane centre of gravity of the combustion chamber recess exhibits an eccentricity $E_h$ in a plane of the piston top surface relative to a reference plane, which eccentricity obeys the conditions: $-0.12*D<E_h<0.12*D$, the reference plane being defined by an intersection line of the two roof-shaped top faces of the combustion chamber and a piston axis, and D being a piston diameter.

6. The internal combustion engine according to claim 5, wherein the plane centre of gravity of the combustion chamber recess exhibits an eccentricity E relative to the piston axis parallel to reference plane, which may be between $-0.03*D$ and $+0.12*D$.

7. The internal combustion engine according to claim 5, wherein the combustion chamber recess is of substantially circular shape.

8. The internal combustion engine according to claim 1, wherein the diameter of the combustion chamber recess is between $0.3*D$ and $0.6*D$, D being the piston diameter.

9. The internal combustion engine according to claim 1, wherein the depth of the combustion chamber recess is between $0.1*D$ and $0.23*D$, D being the piston diameter.

10. The internal combustion engine according to claim 1, wherein a starting point of the flow guiding rib is positioned such that $20°<\alpha<70°$, α being an angle between the reference plane and the starting point of the flow guiding rib, as measured in clockwise direction about the piston axis.

11. The internal combustion engine according to claim 1, wherein an tapered end of the flow guiding rib is positioned such that $120°<\beta<170°$, β being the angle between the reference plane and the end point of the flow guiding rib, as measured in clockwise direction about the piston axis.

12. The internal combustion engine according to claim 1, wherein an inner flow guiding face of the flow guiding rib forms an angle of $-5°$ to $20°$ with the piston axis.

13. The internal combustion engine according to claim 2, wherein the depth of the combustion chamber recess exceeds that of the groove-type inlet passage into said recess.

* * * * *